Patented Oct. 4, 1927.

1,644,493

UNITED STATES PATENT OFFICE.

DONALD G. ROGERS, OF BUFFALO, NEW YORK, ASSIGNOR TO NATIONAL ANILINE & CHEMICAL COMPANY, INC., OF NEW YORK, N. Y., A CORPORATION OF NEW YORK.

METHOD OF EFFECTING CAUSTIC FUSIONS.

No Drawing.      Application filed June 17, 1921. Serial No. 478,324.

This invention relates to improvements in the preparation of indigo by the fusion of organic compounds with caustic alkali.

In carrying out fusions with caustic alkalies at elevated temperatures it has been the practice in many cases to use caustic potash rather than caustic soda, due in part to the lower fusion temperature of the caustic potash which gives sufficient fluidity to allow suitable agitation at temperatures not too high for the process in question. In such fusion processes, an amount of caustic alkali has heretofore been used which is largely in excess of that required in the reaction, usually for the same purpose indicated above, namely, to give fluidity to the reaction mass adequate for suitable stirring.

The present invention is based upon the discovery that the amount of caustic alkali required can be greatly reduced, in some cases to less than 20% of the amount normally used, by adding to the reaction mass a hydrocarbon or mixture of hydrocarbons, such as kerosene, which is liquid at ordinary temperatures and has a boiling point at or above the desired temperature of the reaction. The use of kerosene or similar hydrocarbon in this way not only enables the amount of caustic alkali to be greatly reduced but enables the fusion to take place with increased ease of regulation of temperature, and with avoidance of frothing, as well as with materially decreased time for the completion of the process in many cases. Other advantages of the process will appear from the following more detailed description.

The hydrocarbon liquids which I have found particularly advantageous are the fractions of petroleum commonly known as kerosene and having a boiling point which is as high or higher than the desired temperature of the fusion so that the kerosene will remain in a liquid state at the fusion temperature and act as a flux or diluent as well as a protective agent for the reacting materials. Where the kerosene contains fractions or constituents boiling below that of the desired temperature of the reaction these can readily be removed by distillation. Where the kerosene contains higher boiling constituents which, if not removed, might be difficult to separate from the final product, the kerosene can be further purified before use, for example, by steam distillation, in which case the final product can be freed from the remaining portion of the kerosene in the same way, i. e., by steam distillation. Inasmuch as kerosene is a liquid at ordinary temperatures it can be readily filtered off from the final product and the greater part of it recovered in this way for reuse. It is a characteristic advantage of the invention that the fusion product produced is of a granular or finely divided character. For example, when the melt remaining at the end of the fusion is cooled with agitation the product is obtained in the form of a granular mass wet with the kerosene, and this granular product can be readily handled and subjected to further treatment.

The use of kerosene in carrying out the fusion also makes possible the addition of the caustic alkali to the mixture of kerosene and material to be reacted upon, instead of adding the material to be reacted on to the fused alkali. Moreover, the reaction can be more readily regulated and troublesome foaming, in cases where such foaming is now commonly obtained, can be greatly reduced or avoided altogether.

The following specific examples are given to illustrate possible ways of applying this invention in the preparation of indigo.

*Example 1.*—150 parts of mineral oil of boiling point above 240° C. were heated to 220–225° C., 40 parts of a dehydrated molecular mixture of caustic potash and caustic soda (i. e., a mixture in molecular proportions) were added, followed by 12 parts of sodamide, and then 18 parts of the sodium salt of phenylglycine,

of about 80% purity, were added gradually while maintaining the temperature at 220–225° C. The temperature was then gradually raised to 230° C. and held there for a short time, the melt then allowed to cool with agitation, the mineral oil was then filtered off from the granular product, the filter cake dissolved in water and blown with air. The precipitated indigo was then filtered off and washed free from alkali. Instead of filtering the granular product from the mineral oil before adding it to water, the whole melt can be added to water and the mineral oil separated thereafter. The product obtained by cooling of the melt with agitation is a granular mass wet with the mineral oil which protects the product from oxidation until it is removed.

*Example 2.*—1 part of hydroxyethylaniline,

($C_6H_5.NH.CH_2.CH_2OH.$)

and 2.5 parts of powdered quicklime were mixed with 7 parts of mineral oil and the mixture heated to about 235° C., and 3.5 parts of a dehydrated molecular mixture of the caustic potash and caustic soda were then gradually added and the reaction mixture held at that temperature until the reaction was completed. The product was then worked up in the same way as in the previous example.

The products obtained in the manner above described are protected by the kerosene or mineral oil with which they are wet so that, until they are removed, the product can be kept without objectionable oxidation. So also, since the products are obtained in a granular form they can be readily handled without the difficulties now met with in handling the melts obtained by caustic fusions.

Instead of using kerosene or mineral oil in the processes of the specific examples, other liquids such as hydrocarbons of appropriate boiling point can be similarly used, i. e., hydrocarbons with the boiling point at or above that of the temperature of the fusions. Where the hydrocarbon has a boiling point at or slightly above that of the fusion, it affords an automatic temperature control in preventing overheating of the fusion mass, as the evaporation of the hydrocarbon will act as a cooling means to prevent objectionable increase in temperature. In reactions where water is evolved during the fusion, the water vapor should generally be permitted to escape, and, in such cases, if a reflux condenser is used for the hydrocarbon, it should be maintained at such a temperature as will permit escape of the water vapor.

It will be understood that the term "fusion", as used in the accompanying specification and claims, refers to operations in which the organic body is heated in the presence of alkali and of a liquid hydrocarbon diluent of the character referred to, whether actual melting of the alkali or of the organic body occurs or not, and whether or not the alkali or the organic body or both dissolve in the diluent or remain in suspension therein.

I claim:

1. The improvement in the production of indigo by the caustic fusion of indigo-yielding substances which comprises carrying out the fusion with the addition to the reaction mixture of a petroleum hydrocarbon liquid at ordinary temperatures.

2. The improvement in the production of indigo which comprises carrying out the caustic fusion of phenylglycine in the presence of kerosene and of sodamide.

3. The improvement in the production of indigo which comprises carrying out a caustic fusion of phenylglycine in the presence of sodamide and an indifferent solvent or diluent.

4. The improvement in the production of indigo which comprises carrying out a caustic fusion of phenylglycine with the addition of a hydrocarbon liquid at the temperature of the fusion and with the use of a radically smaller amount of caustic alkali as compared with the amount required when such hydrocarbon is not employed.

5. The improvement in the production of indigo by the caustic fusion of indigo yielding substances which comprises carrying out the fusion in the presence of a hydrocarbon or mixture of hydrocarbons which are liquid at ordinary temperatures and having a boiling point at or about the temperature of the fusion whereby the reaction temperature is regulated by the boiling point of the solvent.

6. The improvement in the production of indigo which comprises carrying out a caustic fusion of phenylglycine in the presence of sodamide and a mineral oil at a temperature of about 220 to 230 degrees.

In testimony whereof I affix my signature.

DONALD G. ROGERS.